United States Patent [19]

Wilson et al.

[11] Patent Number: 4,498,261
[45] Date of Patent: Feb. 12, 1985

[54] LOW PRESSURE VENTING PANEL

[75] Inventors: Bryce H. Wilson, Kansas City; Franklin A. Hansen, Raytown, both of Mo.

[73] Assignee: Continental Disc Corporation, Kansas City, Mo.

[21] Appl. No.: 328,189

[22] Filed: Dec. 7, 1981

[51] Int. Cl.³ .................... B65D 25/00; F16K 17/40
[52] U.S. Cl. ............................................. 52/1; 52/98; 52/208; 220/89 A
[58] Field of Search ............... 52/1, 98, 99, 208, 200; 220/89 A

[56] References Cited

U.S. PATENT DOCUMENTS

| | | |
|---|---|---|
| 1,930,138 | 10/1933 | Van Derhoef . |
| 2,358,143 | 9/1944 | Castor . |
| 2,679,467 | 5/1954 | Sherts . |
| 2,721,157 | 10/1955 | Martin et al. . |
| 2,980,286 | 4/1961 | Coffman ............................ 220/89 A |
| 3,182,855 | 5/1965 | Stock . |
| 3,308,586 | 3/1967 | Olson . |
| 3,319,520 | 5/1967 | Stefano et al. . |
| 3,370,745 | 2/1968 | Parkes et al. . |
| 3,386,215 | 6/1968 | Wendel et al. . |
| 3,445,032 | 5/1969 | Raidl, Jr. et al. . |
| 3,698,598 | 10/1972 | Wood et al. ...................... 220/89 A |
| 3,704,807 | 12/1972 | Lidgard ............................ 220/89 A |
| 3,722,734 | 3/1973 | Raidl ................................ 220/89 A |
| 3,775,915 | 12/1973 | Chambers et al. . |
| 3,807,106 | 4/1974 | Reinhardt et al. . |
| 3,828,493 | 8/1974 | Vezmar . |
| 3,881,629 | 5/1975 | Shaw et al. ...................... 220/89 A |
| 4,027,436 | 6/1977 | Daly . |
| 4,049,221 | 9/1977 | Fountain . |
| 4,050,204 | 9/1977 | Scott . |
| 4,067,154 | 1/1978 | Fike, Jr. . |
| 4,079,854 | 3/1978 | Shaw et al. ...................... 220/89 A |
| 4,094,108 | 6/1978 | Scott . |
| 4,176,503 | 12/1979 | Ting . |
| 4,342,988 | 8/1982 | Thompson et al. ......... 220/89 A X |

FOREIGN PATENT DOCUMENTS

| | | | |
|---|---|---|---|
| 736229 | 9/1955 | United Kingdom | 220/89 A |
| 748953 | 5/1956 | United Kingdom | 220/89 A |
| 848892 | 9/1960 | United Kingdom | 220/89 A |

Primary Examiner—J. Karl Bell
Attorney, Agent, or Firm—Litman, Day and McMahon

[57] ABSTRACT

A low pressure venting panel acts to safely vent a pressure vessel, such as a bag house, from overpressure conditions. The venting panel is particularly responsive and predictable at low pressures. The panel includes a thin rupture body with a central group of apertures and slit lines emanating from the apertures. A thin sealing membrane is bonded to one surface of the rupture body at least in the area of the slits. The characteristics of the sealing membrane enable the membrane to resist expansion in the area of the slits when pressure is applied to the rupture body, thereby resisting rupture of the membrane up to the design rupture limit of the venting panel.

15 Claims, 7 Drawing Figures

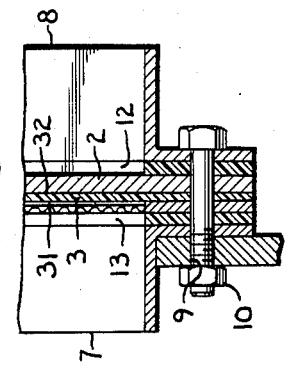
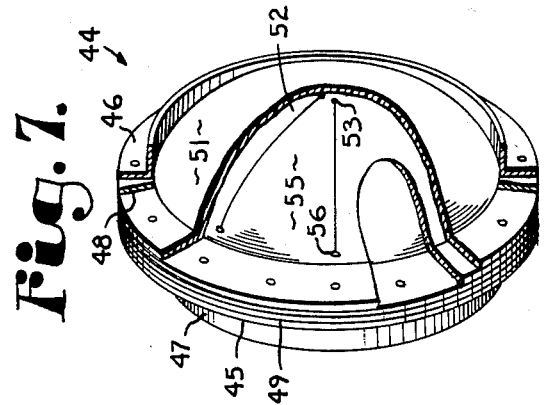
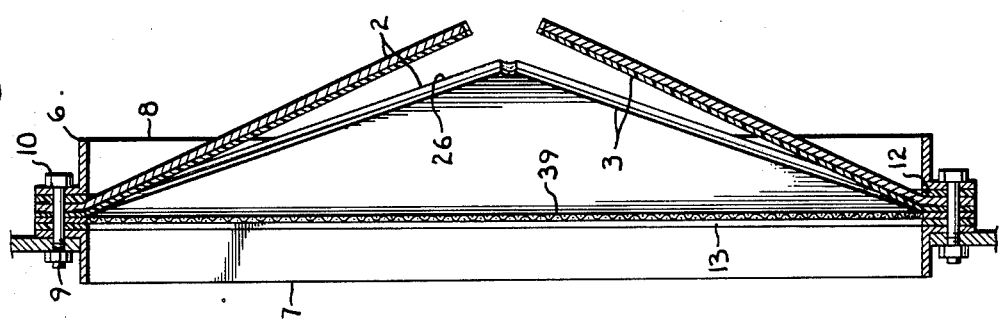
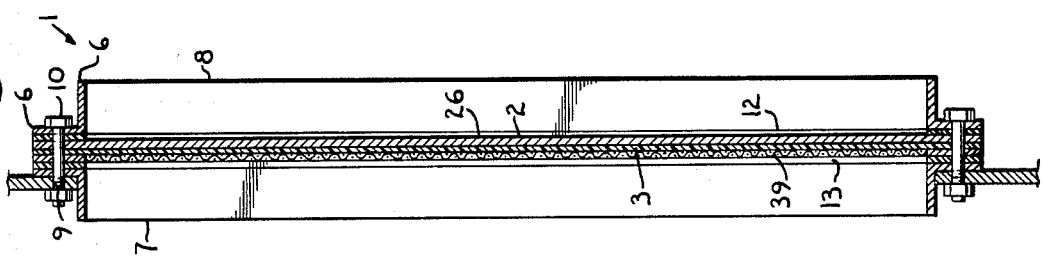
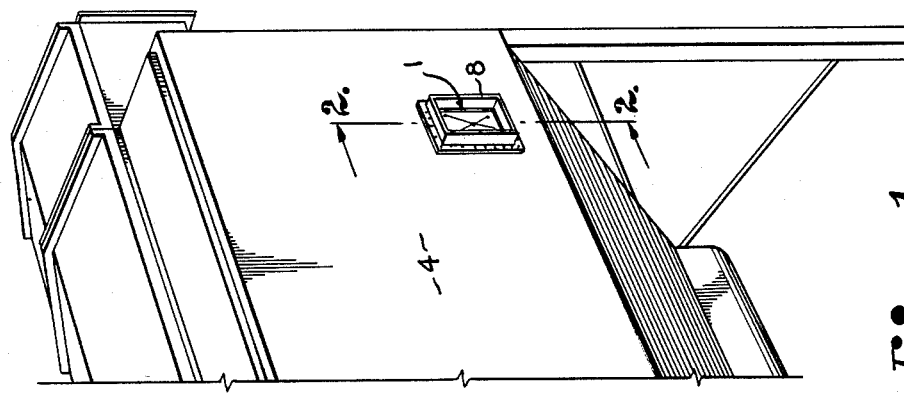

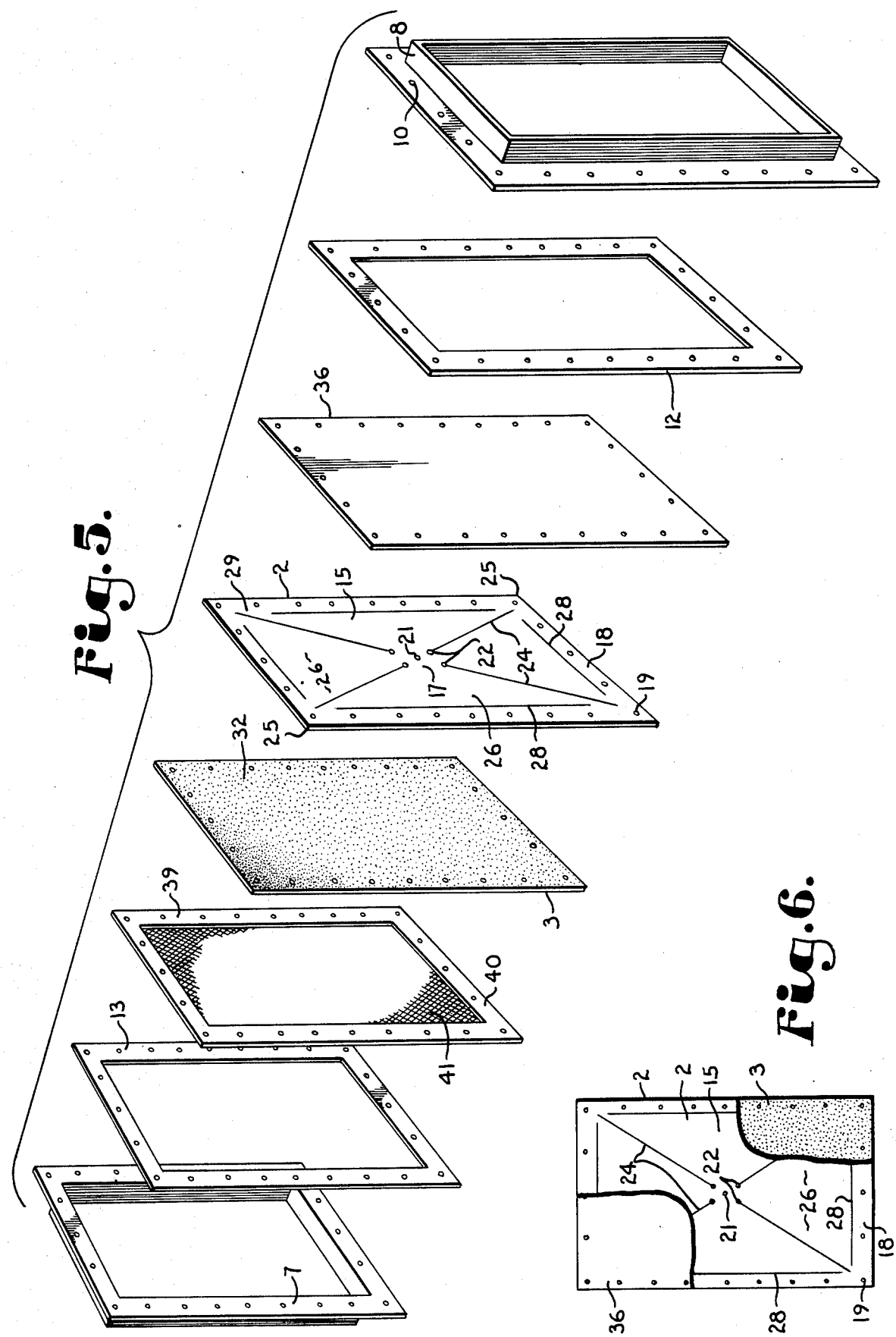

LOW PRESSURE VENTING PANEL

This invention relates to safety pressure relief devices of the rupture disc type and particularly to such devices designed for low pressure bursting.

BACKGROUND OF THE INVENTION

Low pressure venting panels in accordance with the present invention are often used in conjunction with dust collecting equipment, such as bag houses, employed to collect milling dust and the like. Such bag houses are subject to the risk of explosion inherent in dust collection and several such catastrophic explosions occur annually in the United States. Bag houses and the like are generally not rigidly constructed and able to withstand the force of uncontrolled explosions. Thus, vessels such as bag houses require pressure relief safety devices which rupture at relatively low pressure yet predictably rupture so as not to undesirably vent dust into the atmosphere and thereby violate various governmental regulations regarding air pollution.

Early devices for providing vent openings in bag houses and the like include burstable membranes or panels of various types, such as roofing paper, cloth, plastic and metal foils. Some membranes or panels were scored to provide lines of weakness; however, reliability, predictability of burst pressure and adequate opening for proper venting was often unsatisfactory.

In other applications requiring predictable low pressure venting, gaseous processes in large tanks are often subject to explosion or failure. Such tanks are often expensive, the process expensive, and relief devices must be predictable in operation at low pressures.

In an effort to provide predictable low pressure rupture panels or discs, two designs have been heretofore developed. A first rupture disc design is termed a composite disc and utilizes a thin, floating flexible sealing member in conjunction with a slotted metal member. However, this design has been subject to poor cycling life, relatively inaccurate burst pressures and fragmentation which may clog downstream conduits or provide shrapnel like projectiles upon violent rupture. The composite disc has a central burst point aperture and cut slots to ensure opening in the form of leaves and lack of fragmentation. In this disc, a thin, very flexible sealing membrane is disposed beneath a metal top section. The mechanics of rupture involve swinging out of the metal top section until the thin flexible seal expands uncontrollably and rips open in an undefined tear line. This disc structure has inherent design deficiencies in that the slots in the metal top section greatly weaken the metal and cause the top section to be quite flimsy and move up and down in response to process pressure pulsations. This cycling movement induces fatigue and greatly reduces useful life. The addition of a vacuum support or backing member has done little to alleviate fatigue in the metal sheet.

Further, the use of the thin flexible steel creates problems in that the seal tends to balloon through the slots and fails under tension along relatively undesignated lines.

A second design of a low pressure rupture disc, as disclosed by Fike U.S. Pat. No. 4,067,154, uses a solid piece of metal with taped lines and a flexible coating. The burst pressure is determined by the thickness of the metal and the thickness and type of coating. The tape defines sharp-breaking, shear burst lines in the panel. However, this design is also believed to yield relatively inaccurate and difficult to predict burst pressures. Further, this disc also experiences cycling problems which lead to metal fatigue and premature failure.

The low pressure venting panel of the present invention preferably includes a thin rupture body having a central group of apertures and slits through the body emanating from the aperture or apertures. A sealing membrane of semi-elastic or relatively inflexible material is bonded to the rupture body at least in the area of the slits. The sealing membrane resists expansion in the area of the slits when the pressure is applied to the rupture body, thereby resisting rupture of the membrane up to the design rupture limit of the venting panel.

OBJECTS OF THE INVENTION

The principal objects of the present invention are: to provide a venting panel which does not fragment upon burst; to provide such a venting panel which bursts at extremely predictable low pressures; to provide such a venting panel which has highly predictable opening area characteristics; to provide such a venting panel which has quick opening response; to provide such a venting panel which is burstable at low positive or negative pressures; to provide such a venting panel which may be constructed of relatively large sizes for quickly evacuating a large structure; and to provide such a venting panel which is relatively inexpensive, has a relatively long cyclical life without failure from fatigue and permits a relatively high degree of versatility in design variations to enable use in connection with various vessels and structures.

Other objects and advantages of this invention will become apparent from the following description taken in connection with the accompanying drawings wherein are set forth, by way of illustration and example, certain embodiments of this invention.

DESCRIPTION OF THE DRAWINGS

FIG. 1 is a perspective view of a pressure containing chamber having a vent panel therein embodying the present invention.

FIG. 2 is an enlarged longitudinal sectional view taken along lines 2—2, FIG. 1.

FIG. 3 is a longitudinal sectional view of the vent panel showing same in a burst configuration.

FIG. 4 is a fragmentary view of a fastener interconnection of the vent panel.

FIG. 5 is a disassembled, perspective view of the vent panel.

FIG. 6 is a fragmentary, elevational view of the vent panel.

FIG. 7 is a perspective view of an alternate embodiment of the vent panel and showing a domed configuration.

DESCRIPTION OF THE PREFERRED AND ALTERNATE EMBODIMENTS

As required, detailed embodiments of the present invention are disclosed herein, however, it is to be understood that the disclosed embodiments are merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIGS. 2 and 3, generally indicates a venting panel embodying this invention. The panel 1 includes a rupture body 2 having suitable lines of weakness for a predetermined burst path and opening and backed by a sealing membrane 3 of suitable material and character. The rupture body 2 and sealing membrane 3 are suitably associated with clamping flanges, gaskets and the like as described below to comprise the vent panel 1.

As shown in FIG. 1, the venting panel 1 is mounted in normally covering and closing relationship to an opening in a chamber or vessel, such as a bag house 4 or the like, subject to the build up of dangerously high pressures. The venting panel 1, whether used in a bag house 4 or other such chamber or vessel must burst at a predetermined pressure differential between the atmosphere exterior to the vessel and its interior atmosphere and must not burst prior to reaching the designed pressure limit. If the venting panel 1 were to prematurely rupture, polluting dust could escape into the atmosphere in the case of a bag house and, in the case of a process vessel, valuable process gasses could be lost or the batch or process otherwise degraded or ruined.

For securing the rupture body 2 and sealing membrane 3 together and mounting same to the chamber or vessel, mounting structure 6 is provided such as oppositely extending flanged frame members 7 and 8 having fastening means extending around the periphery thereof, such as, in the illustrated example, holes 9 for receiving bolts 10. In the illustrated example, the frame members 7 and 8 are rectangular in configuration and receive the rupture body 2 and sealing membrane 3 therebetween. Flexible gaskets 12 and 13 are provided between the frame members 7 and 8 and include a similar spacing of holes for fitting over the bolts 10 and pulling the entire mounting structure 6 into tight engagement for holding the rupture body 2 and sealing membrane 3 in place.

Referring to FIG. 5, the rupture body 2 is a relatively thin sheet structure of a medium impact strength polystyrene or a relatively soft metal, such as an aluminum alloy or a fully annealed stainless steel for resistance to corrosion by contact with an exterior atmosphere or process gasses. Preferably, the rupture body sheet is relatively thin, in the order of 0.005 inch, and with smooth opposite surfaces 15. The rupture body 2, in the illustrated example of FIG. 5, is likewise of rectangular configuration and is planar. The rupture body 2 has a central portion 17 and a peripheral margin 18, the margin 18 having a pattern of holes 19 therethrough corresponding to the hole pattern of the frame members 7 and 8 and gaskets 12 and 13 for assembly. The peripheral margin 18 provides a clamping edge which is trapped between the frame members 7 and 8.

The rupture body 2 has a group of apertures extending through the central portion 17 and in the illustrated example includes a single centered aperture 21 forming a burst control point and with a grouping of secondary apertures 22 extending also through the central portion 17 and located in symmetrically circumferentially spaced apart relationship about the center aperture 21. In the illustrated example, the secondary apertures 22 are four in number.

A plurality of radially extending breaks or slits 24 are continuous and extend through the rupture body 2. The slits 24 emanate from the secondary apertures 22 and extend toward the respective corner 25 of the body 2, terminating short of the peripheral margin 18 so as to produce a series of leaves 26, four in number in the illustrated example, which divides the body 2 into segments.

As described below, the leaves 26 open or spread outwardly from the centered aperture 21 upon bursting of the rupture body 2 in order to equalize atmospheric pressure on the opposite surfaces 15 and allow venting of chamber or vessel. To aid in outward bending movement of the leaves 26, edge slits 28 extend through the body along the peripheral margin 18 and also terminate short of the corners 25. The sheet material 29 in the area of the corners 25 acts as a bendable hinge so that the leaves 26 split open outwardly in the direction of lower atmospheric pressure without fragmenting or separating from the remainder of the ruptured body 2 upon bursting. Thus, the leaves 26 do not become dangerous projectiles upon bursting nor do they separate from the panel 1 to clog or obstruct piping, conduit or other downstream structures.

The sealing membrane 3 in the illustrated example is a sheet of material of the same size and configuration as the rupture body 2 and is placed in planar surface-to-surface engagement therewith. The sealing membrane 3 is a thin, foil like sheet material or membrane of a semi-elastic material displaying generally less than 20% of elongation in two inches at ambient temperature according to ASTM standards. Such a suitable material includes high density polyethelene, stainless steel and aluminum such as of 0.002 inch thickness which has been cold rolled to a half hard temper. Preferably, the sealing membrane 3 has a process resistant coating, such as a vinyl coating 31 on one surface thereof for exposure to the process and an adhesive coating 32 on the other surface for bonding engagement with surface portions of the rupture body 2. A suitable adhesive is a pressure sensitive acrylic.

The sealing membrane 3 covers the vessel side of the rupture body 2, at least in the area of the slits 24 and 28, and is suitably engaged therewith, as by bonding by the adhesive coating 32. In the illustrated example, the sealing membrane 3 and rupture body 2 are of identical size and the entire engagement surface of the membrane 3 is coated with the adhesive whereby there is bonding engagement over the entire area of contact between the rupture body 2 and the sealing membrane 3.

In the assembly shown in FIG. 5, the rupture body 2 and sealing membrane 3 are shown in conjunction with a non-elastic seal 36 of substantially lesser burst pressure than the rupture body 2 whereby the seal 36 acts as a guard. Preferably, the seal 36 is adhered to the surface of the rupture body 2 on the other side of the sealing membrane 3 and is designed to not materially increase the rupture strength of the venting panel 1.

On the opposite side of the rupture body 2 and sealing membrane 3 from the non-elastic seal 36, a vacuum support 39 is emplaced and includes a peripheral frame or rim 40 holding a mesh or screen sheet 41 which provides support to the rupture body 2 under conditions of vacuum or reverse pressure.

In operation and under application of pressure to the membrane side of the rupture body 2, the combined rupture body 2 and sealing membrane 3 tends to bulge slightly outwardly away from the high pressure side, for example approximately ⅜ of one inch. The bulging removes any slack from the combined body 2 and membrane 3, as the body 2 and membrane 3 are substantially thin, foil type sheets. Upon the application of pressure exceeding the design rupture limit of the body 2, there is a rapid tearing failure in the rupture body 2 emanating from the central portion 17 and centering upon the centered aperture 21. The area of material between the secondary apertures 22 or between the secondary apertures 22 and the centered aperture 21 tears and each of the leaves 26 spread outwardly, hinging upon the sheet material 29 so that the leaves 26 remain connected to the remainder of the rupture body 2 adjacent the peripheral margin 18 and do not fragment or separate therefrom.

During the bulging stage of expansion and prior to rupture, the sealing membrane 3 protects the rupture body 2 from corrosive gasses and further, because of its low percent of elongation, resists expansion in the area of the slits 24 and 28 and the apertures 21 and 22 when pressure is applied to the rupture body 2, thereby resisting rupture of the membrane 3 up to the design rupture limit of the venting panel. Upon bursting of the rupture body 2, the sealing membrane 3 does not tend to pull through any expanded portions or parts in the rupture line 2 but instead tears along the same burst lines as the rupture body without adding materially to the burst strength of the body 2.

The rupture body 2 and sealing membrane 3 of the venting panel 1 may take different shapes, such as the illustrated rectangular shape, or may be square, round or triangular. Further, the rupture body 2 and sealing membrane 3 may assume different configurations, such as flat or planar as illustrated in FIGS. 1 through 6 or domed, as illustrated in FIG. 7.

FIG. 7 constitutes an alternative embodiment of the venting panel 1 and is illustrative of the round, domed shape. The venting panel 44, FIG. 7, includes a mounting structure 45 including spaced, opposite flanged frame members 46 and 47 and clamping gaskets 48 and 49.

The embodiment of FIG. 7 includes a non-elastic, protective seal 51 covering a circular, domed rupture body 52 having a central aperture group 53 and radially extending slits 54 forming a plurality of pie-shaped leaves 55. To prevent excessive tearing upon rupture, the slits have apertures 56 at peripheral marginal terminations thereof. The dome-shaped rupture body 52 has a peripheral margin 57 with a bolt hole pattern for clamping between the frame members 46 and 47.

The alternative venting pattern 44 includes a sealing membrane 60 of according shape with the rupture body 52 and suitably bonded thereto as described in connection with the venting panel 1.

The mechanics of rupture for the domed configuration venting panel 44 are generally the same as for the planar venting panel 1.

As illustrative of the efficiency of the present venting panel, burst pressures of from 1.5 to 3.0 psig (pounds per square inch guage) have been obtained with predictable repeatability in the domed configuration, FIG. 7. Burst pressures of from 0.8 to 2.0 psig have been obtained with predictable repeatability in the planar configuration, FIG. 5. Variation of the burst pressure is achieved by controlling the temper and thickness of the rupture body.

It is to be understood that while one form of this invention has been illustrated and described, it is not to be limited to the specific form or arrangement of parts herein described and shown, except insofar as such limitations are included in the following claims.

What is claimed to be secured by Letters Patent is as follows:

1. A low pressure venting panel comprising:
   (a) a rupture body having a central portion and a peripheral margin;
   (b) said rupture body having a plurality of slits in said central portion, said slits emanating from an area substantially proximate a center of said rupture body toward said peripheral margin so as to define a plurality of leaves such that said leaves are spreadable outward upon rupture of said rupture body toward said peripheral margin so as to define a plurality of leaves such that said leaves are spreadable outward upon rupture of said rupture body;
   (c) a bonding agent on a first side of said rupture body; and
   (d) a sealing membrane abutting said first side of said rupture body such that said rupture body and said sealing membrane are securely bonded to each other by said bonding agent at least on both sides of said slits and substantially adjacent thereto; and said sealing membrane being a semi-elastic material and being substantially resistant to expansion in the area of said slits.

2. The venting panel according to claim 1 wherein:
   (a) said rupture body and said sealing membrane are substantially planar and form a substantially flat panel when bonded together.

3. The venting panel according to claim 1 wherein:
   (a) said rupture body and said sealing membrane have abutting surfaces and are bonded together over the entire abutting surfaces thereof.

4. The venting panel according to claim 2 wherein:
   (a) said rupture body includes an aperture extending through said central portion between the ends of said slits.

5. The venting panel set forth in claim 2 wherein:
   (a) said sealing membrane is aluminum foil having a minimum half hard temper.

6. The venting panel set forth in claim 3 wherein:
   (a) said sealing membrane is aluminum foil having a minimum half hard temper and approximately 0.002 inch thickness.

7. The venting panel set forth in claim 2 wherein:
   (a) said sealing membrane is of high density polyethelene.

8. The venting panel set forth in claim 2 wherein:
   (a) said sealing membrane is stainless steel foil having a minimum half hard temper.

9. The venting panel set forth in claim 2 wherein:
   (a) said sealing membrane has the same configuration as said rupture body and has surface-to-surface bonded engagement therewith over substantially the entire surface area of said sealing membrane.

10. The venting panel set forth in claim 2 wherein:
    (a) said rupture body is of fully annealed metal foil.

11. The venting panel set forth in claim 2 wherein:
    (a) said rupture body is of fully annealed stainless steel and has a thickness of approximately 0.005 inch.

12. The venting panel set forth in claim 2 wherein:
    (a) said rupture body is of medium impact strength polystyrene.

13. A low pressure venting panel comprising:

(a) a rupture body of fully-annealed stainless steel having a thickness of approximately 0.005 inch, said rupture body having a central portion and a peripheral margin; and (b) said rupture body having a plurality of slits in said central portion, said slits emanating from an area substantially proximate a center of said rupture body toward said peripheral margin and defining a plurality of leaves in said rupture body; said leaves being spreadable outward upon rupture of said rupture body; said rupture body having a group of apertures extending through said central portion and located in spaced apart relation in and around said center portion; one of said aperutres defining an end of each slit respectively and spaced a generally equal distance from a center of said rupture body as compared to other such apertures defining the ends of slits;

(c) a bonding agent on a first surface of said rupture body;

(d) a sealing membrane having a surface abutting said first surface of said rupture body; said sealing membrane surface being bonded to said rupture body first surface such that said sealing membrane is bonded to said rupture body over substantially an entire portion of said rupture body first surface adjoining said sealing membrane; said sealing membrane being of aluminum foil having a half hard temper, a thickness of approximately 0.002, and less than 20% of elongation in two inches at ambient temperature (ASTM).

14. A low pressure venting panel according to claim 13 wherein:

(a) said sealing membrane has a plastic seal coating on one side and an adhesive on another side; said adhesive being said bonding agent; said adhesive side being bonded to said rupture body across the entire surface thereof.

15. A low pressure venting panel according to claim 14 wherein:

(a) said rupture body and sealing membrane are substantially planar and form a substantially flat rupture disk when bonded together.

* * * * *